April 16, 1963    R. H. HUDDLESTON, JR    3,085,436
TEMPERATURE MEASURING SYSTEM
Original Filed Sept. 2, 1955

INVENTOR.
Richard H. Huddleston, Jr.
BY James M. Peppera
AGENT

3,085,436
TEMPERATURE MEASURING SYSTEM
Richard H. Huddleston, Jr., Houston, Tex., assignor, by mesne assignments, to Halliburton Company, a corporation of Delaware
Continuation of application Ser. No. 532,154, Sept. 2, 1955. This application May 2, 1960, Ser. No. 26,208
5 Claims. (Cl. 73—361)

This application is a continuation of applicant's co-pending application Serial No. 532,154, filed September 2, 1955, now abandoned, for "Temperature Measuring System," in which are cited as prior art Patents No. 1,199,724, No. 1,261,086, No. 1,643,668, No. 1,982,053, No. 2,412,575, No. 2,414,719 and No. 2,742,786.

This invention generally relates to temperature measuring and recording systems, and more particularly relates to the measurement of temperatures in well bores or the like.

The recording of temperature variations in oil wells or other bore holes is useful for several purposes and the art is well developed. See, for example, the U.S. patent to Waters, No. 2,517,455, granted August 1, 1950, on a "Temperature Recorder."

In ordinary thermocouple temperature measuring circuits, the cold or reference junction is maintained at a constant temperature, so that the difference in temperature between the reference and the sensing junction can create a difference in potential which can be measured and be indicative of the temperature at the sensing junction.

In measuring the temperatures in well bores both thermocouples need to be lowered into the well bore since the well may be thousands of feet deep and it is not practical to keep one junction at the surface while exploring with the other. The voltage generated by thermocouples is very small and thus is not suitable for transmission over such great distances.

Also, it is not practical to maintain the reference junction at a constant known temperature in a well bore since an oven to provide such constant temperature (at about 400° F.) would be very complex and require power in excess to that available over such long conductors.

The present invention employs a circuit containing thermocouples, one of which is responsive to a compensating network which modifies the characteristics of the circuit in such a way as to null out the potential produced by variations in temperature of the reference thermocouple. The temperature at the sensing thermocouple can then be measured and recorded. Means included in the compensating network is provided to adjust or control the point of zero suppression such that a plurality of small sections of the total temperature range may be measured in detail.

Figure 1:
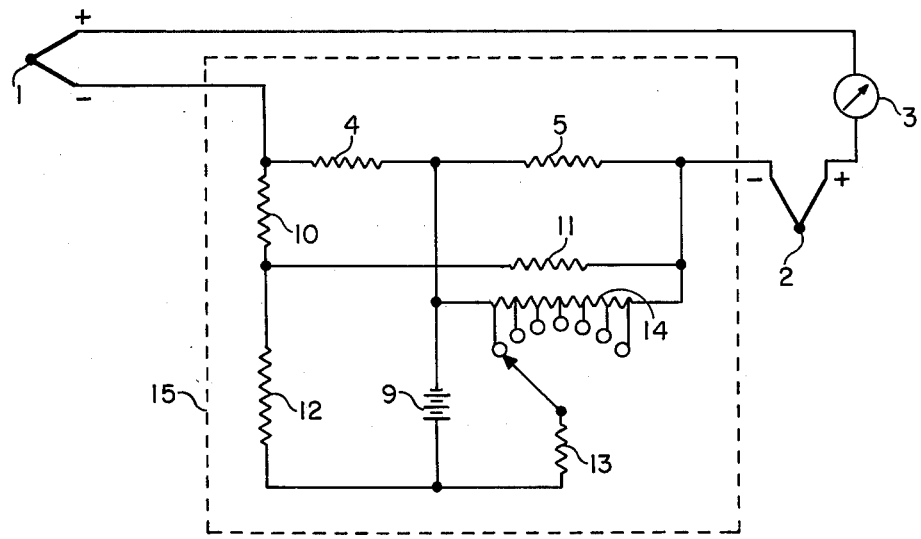
Figure 2:
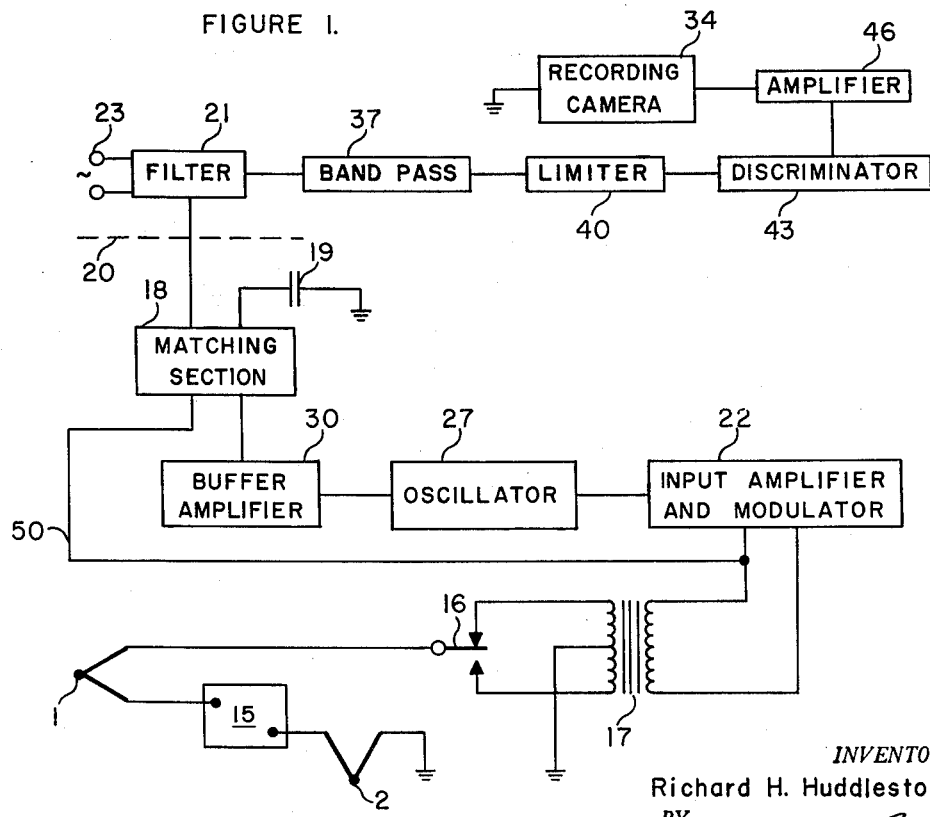

The objects of the invention, and the manner in which they are accomplished will be apparent from the following description, taken in connection with the accompanying drawings in which:

FIGURE 1 is a circuit diagram of a temperature measuring system constructed in accordance with the invention, and FIGURE 2 is a block diagram of a signal transmission and recording circuit in which the temperature measuring system of FIGURE 1 is incorporated.

Referring to the drawing in detail, and first to the arrangement of FIGURE 1, it will be seen that the circuit there shown includes two thermocouples 1 and 2, an indicating meter 3 and a compensating network 15 enclosed within the dashed line.

Each of the thermocouples 1 and 2 may be of standard construction and consists of two elements of dissimilar metal, such as iron and "constantan." The thermocouple 1 may be referred to as the hot junction or sensing element while the thermocouple 2 may be referred to as the cold junction or reference element.

In accordance with the present invention the two thermocouples are run into the well at the same time so that both are subjected to essentially the same temperature; however, thermocouple 1 is exposed to the well fluid directly and exhibits a very rapid thermal response while thermocouple 2 is located within the body of the tool and is subject to a large and variable thermal lag.

The compensating network 15 balances out the effect of the temperature variation on one of the thermocouples, such as the thermocouple 2, so that the indicating meter 3 can indicate the temperature existing at the other thermocouple 1.

An arrangement providing the desired features for deflection type indications is shown in FIGURE 1, together with facilities permitting flexibility in mode of operation.

With reference to FIGURE 1, the hot junction 1 is connected in series with a cold junction 2, indicating meter 3, and resistors 4 and 5. Resistor 4 and cold junction 2 are provided in the same thermal environment.

Resistor 4 is constructed of material having a desired positive temperature coefficient of resistance, and of a value such that, with a known amount of current passing through it, the change in voltage drop across it resulting from an ambient temperature change will exactly match the change in the potential produced by the cold junction 2 over the same ambient temperature range.

Due to close physical proximity of cold junction 2, and compensating resistor 4, and the opposite potential polarities, changes in ambient temperature over an extreme range will be compensated, thus preventing errors in temperature measurement by the hot junction 1.

Resistor 5 is chosen such that its value is approximately equal to the compensating resistor 4, when the latter is at some reference temperature, such as 32° F., at which temperature all reference will be made in this description.

Resistors 10 and 11 are much larger in value than resistors 4 and 5 and proportioned such that current flow from a D.C. source 9 through resistors 10 and 11 create equal voltage drops across resistors 4 and 5 at the reference temperature of 32° F. This relation holds regardless of the exact value of current flow, and thus may be termed the low temperature calibration. It is apparent then that if resistors 4 and 5 are exactly equal in value at 32° F., resistors 10 and 11 will also be equal in value.

Resistor 12 is chosen such that the correct current will flow through compensating resistor 4 to provide the desired compensation at some elevated temperature, such as 212° F. This may be termed the high temperature calibration. Thus, two compensating points have been calibrated to provide equal and opposite potentials across resistor 4 and cold junction 2 at desired temperature extremes. Any errors at temperatures other than these would be due only to mis-tracking between the thermocouple potential curve and temperature characteristic curve of compensating resistor 4.

As an example the resistors 4 and 5 may have a resistance of 10 ohms each, the resistors 10 and 11 a resistance of 5,000 ohms, and the resistor 12 a resistance of 75,000 ohms. The resistor 4, which is the only resistor having a positive temperature coefficient, may be made of nickel. The others may be made of "constantan," an alloy of approximately 55% copper and 45% nickel.

Shown at 14, along with the resistor 13 and the source 9, is a shunt which serves to change the current flowing through the resistor 5. This current, in addition to that current through 5 from resistor 11, serves to null the voltage generated by thermocouple 1 at temperatures above the 32° F. reference temperature. Thus, a zero reading on the indicator meter 3 is again attained at temperatures above the 32° F. reference temperature. Thus when the indicator reading is zero while the junction temperature is a certain definite amount, the zero suppression is that certain definite amount. Resistor 13, which is provided of much larger value than shunt 14 and resistor 5, provides an essentially constant current to be divided by shunt 14. As an example, the shunt 14 may have a resistance of 1240 ohms to cover the temperature range of 32° F. to 280° F. Resistor 13 may have a resistance of 105,000 ohms, and source 9 may have a value of 150 volts D.C.

Stepping contacts, as indicated on shunt 14, may be provided to raise the point of zero suppression in equal increments, each of said increments then being indicated at full scale on meter 3. As an example, meter 3 could have a full scale range of 30° F. and each contact then raise the point of zero suppression in 30° F. increments.

Is is evident, if resistors 10 and 11, and 12 are very much larger in value than resistors 4 and 5, that the magnitude of current flow is determined, for all practical purposes, solely by resistors 10, 11 and 12. Resistors 4 and 5 may thus be considered as constant current devices.

It is then possible to perform current addition in resistor 5 by introducing, as described above, an additional current having the desired magnitude and direction. By this means the adjustable zero suppression feature is added. Potentiometer 14, in combination with source 9, resistor 13 and resistor 5 serves as a conventional Ayrton or universal shunt with resistor 5 as the load. The Ayrton or universal shunt is described in detail in Section 3-30 of Standard Handbook For Electric Engineers, 8th edition, McGraw-Hill Book Company, 1949.

Thus, the current introduced in resistor 5 from resistor 13 is a linear function of the tap position of the potentiometer. This holds true providing constant current is supplied to the shunt 14, therefore resistor 13 has a very large value compared to the resistance of the shunt.

Resistor 13 is also chosen such that potentiometer 14 may be calibrated directly in units of temperature (i.e., plus 30° F. to 280° F.) thus allowing the selection of a point of zero suppression throughout the entire temperature range.

It is evident that potentiometer 14 could be replaced with a series of fixed resistors with points between them selected by means of a multiple point switch. It is also evident that potentiometer 14 could be replaced with a single fixed resistance should the zero suppression require only one point, rather than being adjustable. Several means for switching the tap of shunt 14 to change the point of zero suppression are possible. The setting may be continuously adjustable by local manual means, or more appropriately, remotely controlled either by a bi-directional stepping device or any other well known means. (See for example, the remotely controlled stepping circuit of U.S. Patent No. 2,338,872 to Robidoux.) Though less utility is foreseen for measuring widely varying well bore temperatures, such setting could be predetermined and fixed at any point provided by such adjustment. It is seen that the sensitivity of the arrangement just described is a function of the indicating meter 3 and is not affected by the point of zero suppression.

FIGURE 2 illustrates how the temperature logging system of FIGURE 1 may be incorporated with a telemetering and recording circuit. In this figure the horizontal dashed line 20 represents the surface of the ground. The portions above the line 20 are at the surface of the ground.

The general principles of the arrangement of FIGURE 2 are disclosed in U.S. Patent No. 2,573,133 to Greer on a "Well Logging System," and will not be described herein in detail.

The temperature measuring portion of the circuit of FIGURE 2 is the same as that of FIGURE 1, except that a converter or chopper 16 is inserted in lieu of the meter 3 of FIGURE 1. This may be a vibrating reed or any other form of device (i.e., electromagnetic, electrostatic or photoelectric) for converting direct current to alternating current. In one form of the invention now in commercial use, the output of the converter is a square wave of 60 cycles.

It will now be apparent to those skilled in the art and familiar with the above Patent No. 2,573,133 to Greer, that the output of the converter 16 of FIGURE 2 may be impressed on the primary of a transformer 17 so that the secondary of the transformer may be fed to an amplifier and modulator 22. This amplifier and modulator, which includes converter 16 and transformer 17, forms a part of a frequency modulated telemetering and recording system which also includes the oscillator 27, the buffer amplifier 30 and the matching section 18.

An alternating current of suitable frequency, such as 60 cycles, is supplied by the source 23 through the matching section 18 to converter 16 and one portion of the matching section may be grounded through the condenser 19 as illustrated.

The frequency modulated signal, which is modulated in response to the temperature at thermocouple 1, flows to the matching section through the conductor 50. The signal then passes up to the surface of the ground through a single conductor cable to the filter 21. From the filter 21, the signal may go through a band pass 37, a limiter 40, a discriminator 43 and an amplifier 46, to a recording camera 34.

The signal, when received at the surface and subsequently converted to a permanent record, is alternating current of suitable frequency, herein exampled as 60 cycles, having an amplitude proportional to the temperature being measured. As previously described, this signal when compared with a reference signal having the same frequency, will exhibit phase reversal characteristics on either side of the null (point of zero suppression). To those skilled in the art this will be recognized as a normal condition in A.C. type bridge configurations.

It will be apparent then, that by means of a phase detector, many well known methods being applicable, the signal and thus the temperature measurement are properly identified, preventing sensing errors or ambiguity as to direction of temperature change.

While only one embodiment of temperature measuring system is disclosed herein, it is obvious that changes may be made in it, as well as in the system for transmitting signals from it to the surface of the ground, without departing from the spirit of the invention or the scope of the annexed claims.

I claim:

1. A temperature measuring system comprising, a current source having a first and a second terminal, a first constant current flow means in connection with said first terminal of said source, a second and a third constant current flow means in common connection with said first current flow means, a temperature insensitive potential balance means for providing a selected balance potential in connection between said second constant current flow means and said second terminal of said source, a temperature sensitive potential compensating means for providing a temperature responsive compensating potential in connection between said third constant current flow means and said second terminal of said source, a sensing thermocouple means, a terminal of first polarity of said sensing thermocouple means in connection with said third constant current flow means and said potential compensating means, a reference thermocouple means, a terminal of first polarity of said reference thermocouple means in connection with said second constant current flow means and said potential balance means, said reference thermocouple means being in thermal transferring relationship with said potential compensating means, a potential detection means in respective connection with terminals of second polarity of said sensing and reference thermocouple means for detecting potential variations between said thermocouple means, a current dividing means in shunt connection with said potential balance means to variably increase the current through said potential balance means to vary the potential across said potential balance means, and a fourth constant current flow means in connection with said first source terminal and in current dividing connection with said dividing means.

2. A temperature measuring system comprising, a current source having first and a second terminal, a first and a second constant current flow means in common connection with said first terminal of said source, a temperature insensitive potential balance means for providing a selected balance potential in connection between said first constant current flow means and said second terminal of said source, a temperature sensitive potential compensating means for providing a temperature responsive compensating potential in connection between said second constant current flow means and said second terminal of said source, a sensing thermocouple means, a terminal of first polarity of said sensing thermocouple means in connection with said second constant current flow means and said potential compensating means, a reference thermocouple means, a terminal of first polarity of said reference thermocouple means in connection with said first constant current flow means and said potential balance means, said reference thermocouple means being in thermal transferring relationship with said potential compensating means, a potential detection means in respective connection with terminals of second polarity of said sensing and reference thermocouple means for detecting potential variations between said thermocouple means, a current dividing means in shunt connection with said potential balance means to variably increase the current through said potential balance means to vary the potential across said potential balance means, and a third constant current flow means in connection with said first source terminal and in current dividing connection with said dividing means.

3. A temperature measuring system comprising, a current source having a first and a second terminal, a first constant current flow resistor in connection with said first terminal of said source, a second and a third constant current flow resistor in common connection with said first flow resistor, a potential balance resistor of negligible temperature resistance coefficient providing a selected balance potential in connection between said second constant current flow resistor and said second terminal of said source, a potential compensating resistor providing a temperature responsive compensating potential in connection between said third constant current flow resistor and said second terminal of said source, a sensing thermocouple means, a terminal of first polarity of said sensing thermocouple means in connection with said third constant current flow resistor and said potential compensating resistor, a reference thermocouple, a terminal of first polarity of said reference thermocouple in connection with said second constant current flow resistor and said potential balance resistor, said reference thermocouple being in thermal transferring relationship with said potential compensating resistor, a potential detection means for detecting potential variations, terminals of second polarity of said sensing and reference thermocouple means in respective connection with said potential detection means, a current dividing resistor in shunt connection with said potential balance resistor, and a fourth constant current flow resistor in connection with said first terminal of said source and in current dividing connection with said dividing resistor, said first, second, third and fourth constant current flow resistors having a negligible temperature resistance coefficient.

4. A temperature measuring system comprising, a current source having a first and a second terminal, a first and a second resistor in common connection with said first terminal of said source, a potential balance resistor of negligible temperature resistance coefficient providing a selected balance potential in connection between said first resistor and said second terminal of said source, a potential compensating resistor providing a temperature responsive compensating potential in connection between said second resistor and said second terminal of said source, a sensing thermocouple means, a terminal of first polarity of said sensing thermocouple means in connection with said second resistor and said potential compensating resistor, a reference thermocouple, a terminal of first polarity of said reference thermocouple in connection with said first resistor and said potential balance resistor, said reference thermocouple being in thermal transferring relationship with said potential compensating resistor, a potential detection means for detecting potential variations, terminals of second polarity of said sensing and reference thermocouple means in respective connection with said potential detection means, a current dividing resistor in shunt connection with said potential balance resistor, and a third resistor in connection with said first terminal of said source and in current dividing connection with said dividing resistor, said first, second and third resistors having a negligible temperature resistance coefficient.

5. A temperature measuring system comprising a current source having a first and a second terminal, a first constant current flow resistor in connection with said first terminal of said source, a second and a third constant current flow resistor in common connection with said first constant current flow resistor, a potential balance resistor of negligible temperature resistance coefficient providing a selected balance potential in connection between said second constant current flow resistor and said second terminal of said source, a potential compensating resistor providing a temperature responsive compensating potential in connection between third constant current flow resistor and said second terminal of said source, a sensing thermocouple means, a terminal of first polarity of said sensing thermocouple means in connection with said third constant current flow resistor and said potential compensating resistor, a reference thermocouple, a terminal of first polarity of said reference thermocouple in connection with said second constant current flow resistor and said potential balance resistor, said reference thermocouple being in thermal transferring relationship with said potential compensating resistor, a potential converter means for converting potential variations into a varying alternating current signal, terminals of second polarity of said sensing and reference thermocouple means in respective connection with said potential detection means, a current dividing resistor in shunt connection with said potential balance resistor, and a fourth constant current flow resistor in connection with said first terminal of said source and in current dividing connection with said current dividing resistor, signal transmission means in connection with said converter means, and indication means in conection with said transmission means for converting the alternating signal into an indication of potential variation between said thermocouple, said first, second, third and fourth constant current flow resistors having a negligible temperature resistance coefficient.

References Cited in the file of this patent
UNITED STATES PATENTS

| | | |
|---|---|---|
| 1,261,086 | Wilson | Apr. 2, 1918 |
| 1,617,416 | Pierce | Feb. 15, 1927 |
| 2,769,340 | Bernreauter | Nov. 6, 1956 |
| 2,877,650 | Koletsky | Mar. 17, 1959 |